US008239774B2

United States Patent
Gandhi et al.

(10) Patent No.: US 8,239,774 B2
(45) Date of Patent: Aug. 7, 2012

(54) UTILIZING MOOD SENSORS IN AN ELECTRONIC MESSAGING ENVIRONMENT

(75) Inventors: Shruti Gandhi, Poughkeepsie, NY (US); Angela Richards Jones, Durham, NC (US); Pamela Ann Nesbitt, Tampa, FL (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/845,808

(22) Filed: Aug. 28, 2007

(65) Prior Publication Data
US 2009/0063992 A1 Mar. 5, 2009

(51) Int. Cl.
*G06F 3/00* (2006.01)
(52) U.S. Cl. ........ 715/752; 715/230; 715/231; 715/233; 715/753
(58) Field of Classification Search .................... 715/752
See application file for complete search history.

(56) References Cited

U.S. PATENT DOCUMENTS

| | | | |
|---|---|---|---|
| 6,190,314 B1 * | 2/2001 | Ark et al. ................ | 600/300 |
| 7,073,129 B1 * | 7/2006 | Robarts et al. ............ | 715/740 |
| 7,884,824 B2 * | 2/2011 | Reponen ................. | 345/440 |
| 7,921,369 B2 * | 4/2011 | Bill ......................... | 715/753 |
| 2002/0197967 A1 * | 12/2002 | Scholl et al. ............. | 455/118 |
| 2004/0082839 A1 * | 4/2004 | Haugen .................... | 600/300 |
| 2006/0221935 A1 * | 10/2006 | Wong et al. ............... | 370/352 |
| 2007/0005700 A1 * | 1/2007 | Wagner et al. ............ | 709/204 |

OTHER PUBLICATIONS https://priorart.ip.com/viewPub.jsp? stype=dtFreeTextSearch&scache=19494272&snum=l&kwHighlight=true&squery=kwhl%2509true%09dtb%2509%09dta%2509%09kw%25090%09sby%2509origPubDate%09lng%2509%09my%2509%09ftq%2509message%252Band%252Bmood%09cty%2509%09ss%2509%09 "Tacit Enhanced Instant Messaging", *IP.COM Prior Art Database*, Jul. 14, 2004 (3 pages).
http://www.halfbakery.com/idea/emotion_20font "Emotion Font-Add Subtlety to Your Emails" HalfBakery.com, Apr. 20, 2000 (2 pages).

* cited by examiner

*Primary Examiner* — Alvin Tan
(74) *Attorney, Agent, or Firm* — Marcia L. Doubet (57) ABSTRACT

A method, system and computer-usable medium are disclosed for determining the behavioral mood of an electronic messaging system user. User input is provided through one or more input receptors of an electronic device. The user input is collected by the mood identification system. The collected input is processed to generate behavioral biometrics, which are in turn correlated to predetermined behavioral moods, each of which has a corresponding behavioral mood indicator. The behavioral mood of the recipient user is indicated by applying text attributes to the user's identifier (ID) or by displaying an icon proximate to the user's ID.

20 Claims, 6 Drawing Sheets

UTILIZING MOOD SENSORS IN AN ELECTRONIC MESSAGING ENVIRONMENT

BACKGROUND OF THE INVENTION

1. Field of the Invention

Embodiments of the disclosure relate in general to the field of computers and similar technologies, and in particular to software utilized in this field. Still more particularly, it relates to determining the behavioral mood of an electronic messaging system user.

2. Description of the Related Art

An instant messaging system (IMS) provides a simple way to exchange real-time, text-based messages between users who are connected to on-line or electronic networking environments such as the Internet, intranets, and extranets. These systems, which have gained popularity due to their simplicity and ease of use, require both sender and recipient to be simultaneously logged-on to exchange messages. To send an IMS message, a user generally logs on with an IMS client, selects one or more recipients from an address book of other IMS users that are indicated to be on-line, and then composes and sends their message.

One issue with IMS systems is the inability to determine a user's mood. Current approaches to this issue include the user applying emoticons or icons within the text of the message to indicate their mood or disposition. However, this can be problematic, as the emoticon or icon may not accurately portray the user's actual mood. This misdirection may be intentional or unintentional. Regardless, the indication of the user's actual mood is inaccurate which can lead to misunderstandings and other communication issues between messaging system users. In addition, it is generally not possible to determine the mood of a user prior to establishing a message session. For example, if it were possible to indicate that the intended recipient of a message is currently angry or in a bad mood, the message originator could decide to postpone the messaging session. Currently, this is not possible.

Various approaches exist for the autodetermination of a user's changing mood through the collection, analysis and correlation of behavioral biometrics. As an example, a user's mood can be ascertained by analyzing the pressure applied to the keys of a touch-sensitive keyboard, their typing speed and patterns, and the pauses between words. These behavioral biometrics can also be combined with other biometrics, such as skin temperature, heart rate, and other biophysical factors, thus deriving their mood. In view of the foregoing, it would be advantageous if these approaches to mood determination could be used by messaging clients to improve the interaction between messaging system users.

BRIEF SUMMARY OF THE INVENTION

The present invention includes, but is not limited to, a method, system and computer-usable medium for determining the behavioral mood of an electronic messaging system user. In various embodiments of the invention, instant messaging system (IMS) operations are initiated with the selection of an IMS message recipient within the user interface (UI) of an IMS client. The behavioral mood of the recipient user is indicated by the application of visual attributes, such as bolding or coloring the text of the user's identifier (ID) or by displaying an icon proximate to the user's ID. As an example, a smiling face icon may indicate that the IMS user is in a good mood, while a frowning face icon might indicate that the IMS user is in a bad mood.

In different embodiments, the IMS user provides user input to an electronic device through one or more input receptors. As the user input is provided to the various input receptors, it is collected by the mood identification system. The collected input is then processed to generate behavioral biometrics, which are in turn correlated to predetermined behavioral moods. Each of these predetermined behavioral moods has a corresponding behavioral mood indicator which is applied to the user ID during the course of the IMS message session. In one embodiment, the behavioral mood indicator changes as the behavioral mood of the user changes, and is indicated through the application of visual attributes, such as changes in the color of the user's text ID, or by displaying different icons. For example, smiling, neutral, stern, or sad face icons are displayed to indicate the user's behavioral mood has changed respectively from happy, to receptive, to concerned, to angry.

In another embodiment, behavioral biometrics are collected during the generation of the IMS message and are then processed to generate a set of generalized behavioral biometrics. The set of generalized behavioral biometrics is then correlated to predetermined behavioral moods to indicate the user's generalized behavioral mood when the IMS message was generated. The visual attribute or icon associated with the generalized behavioral mood is then applied to the IMS message. In one embodiment, IMS messages can be sorted by their respective behavioral moods, much like a list can be sorted in ascending or descending alphabetical order. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and computer-usable medium are disclosed for determining the behavioral mood of an electronic messaging system user. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
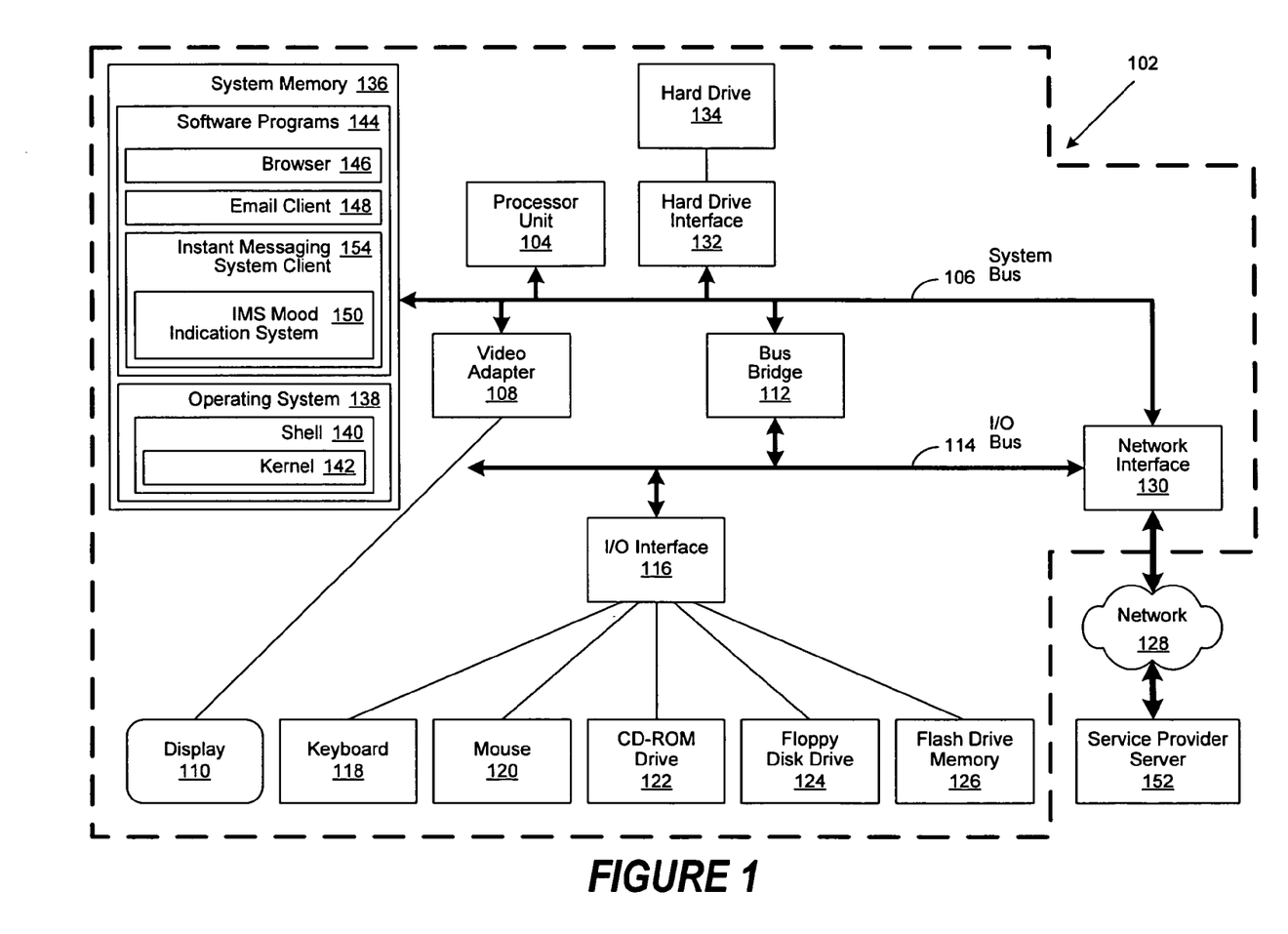
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146, email client 148, and instant messaging system (IMS) client 154. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. The IMS client 154 further comprises a mood indication system 150. The mood indication system 150 includes code for implementing the processes described in FIGS. 2 through 5 described hereinbelow. In one embodiment, client computer 102 is able to download the mood indication system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
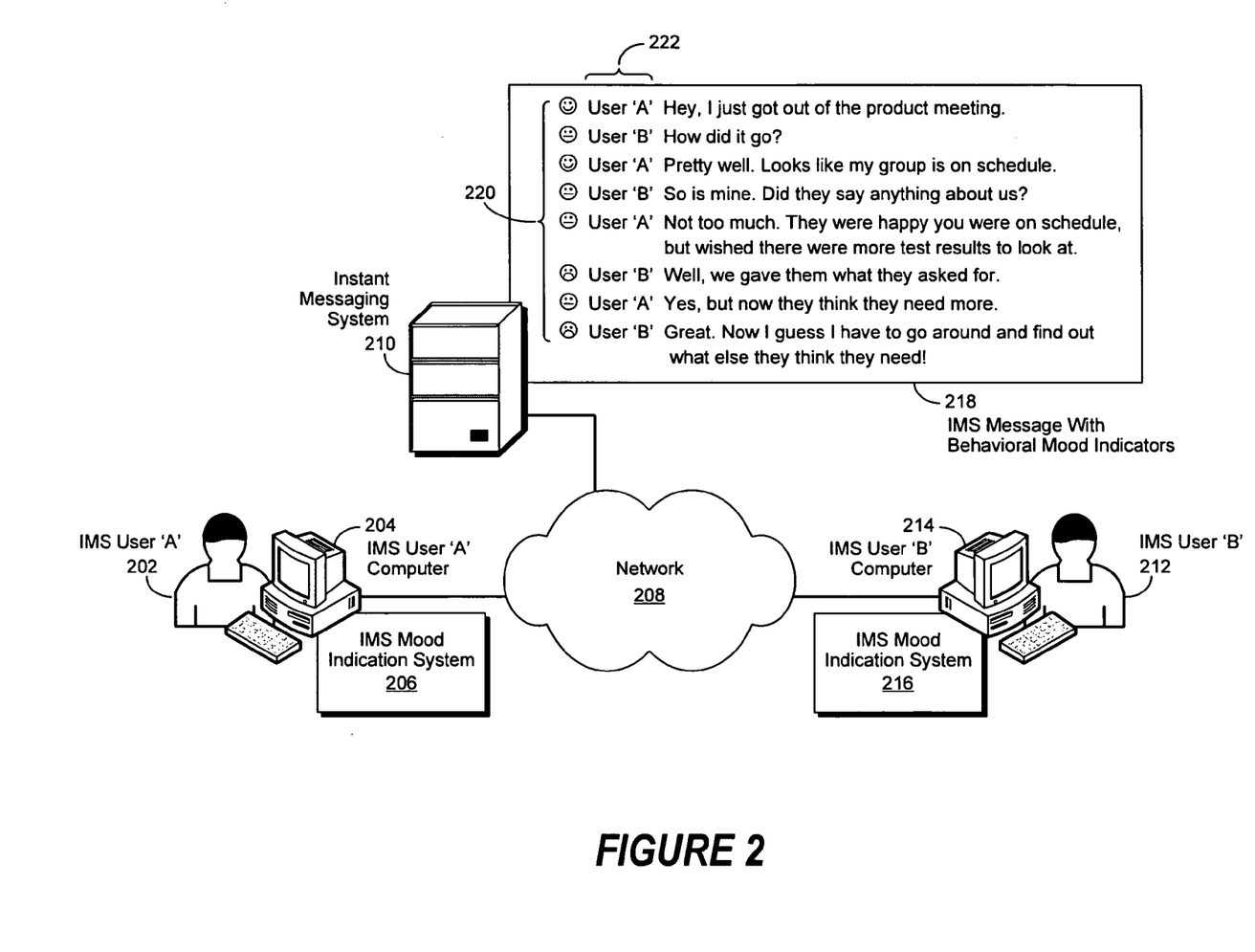
FIG. 2 shows a mood indication system as implemented in an embodiment of the invention to determine the behavioral mood of an instant messaging system (IMS) user.

FIG. 2 shows a mood indication system as implemented in an embodiment of the invention to determine the behavioral mood of an instant messaging system (IMS) user. In various embodiments, instant messaging system (IMS) operations are begun with IMS message user 'A' 202 accessing IMS system 210 through network 208 to initiate an IMS session with IMS message user 'B' 202. Once the IMS session is initiated, then the collection of behavioral biometrics and their correlation to corresponding behavioral moods is activated by the IMS mood indication system 206, 216 implemented on the respective computer systems 204, 214 of IMS users 'A' 202 and 'B' 212.

Skilled practitioners of the art will be aware that a variety of approaches exist for determining the behavioral mood of a user through the collection, analysis and correlation of behavioral biometrics. In various embodiments, IMS users 'A' 202 and 'B' 212 provide user input to their respective computer systems 204, 214 through one or more input receptors. The input receptor may be keyboard comprising either electro-mechanical or touch-sensor keys, a touch-sensitive screen, a touchpad, a pointing device such as a mouse or graphics pad, a biometric sensor, or any combination of these.

As the user input is provided to the various input receptors, it is collected by the mood identification system 206, 216 respectively implemented on their computer systems 204, 214. The collected input is then processed to generate behavioral biometrics, which are in turn correlated to predetermined behavioral moods. For example, each user has a distinct keystroke pattern when using a keyboard. This pattern changes with the behavioral mood of the user. Keystroke latencies and durations can be captured from a keyboard comprising electro-mechanical keys. Similarly, different pressures exerted on individual keys can be captured from a keyboard comprising touch-sensor or pressure sensitive keys. As described in greater detail herein, these patterns, latencies, durations and pressures, when analyzed and correlated, can be indicators of the behavioral mood of the user.

As behavioral biometrics are collected and correlated to corresponding behavioral moods, the behavioral mood of IMS user 'A' 202 and IMS user 'B' 212 is indicated by the application of an icon 220 proximate to the user's ID 222 within the IMS message 218. As an example, a smiling face icon may indicate that the IMS 'A' 202 user is in a good mood, while a frowning face icon might indicate that the IMS user 'B' 212 is either upset or in a bad mood. In one embodiment, the behavioral mood indicators change as the behavioral mood of the user changes. In this embodiment, different icons are displayed, such as smiling, neutral, stern, or sad face icons to indicate the user's behavioral mood has changed respectively from happy, to receptive, to concerned, to angry.

Figure 3:
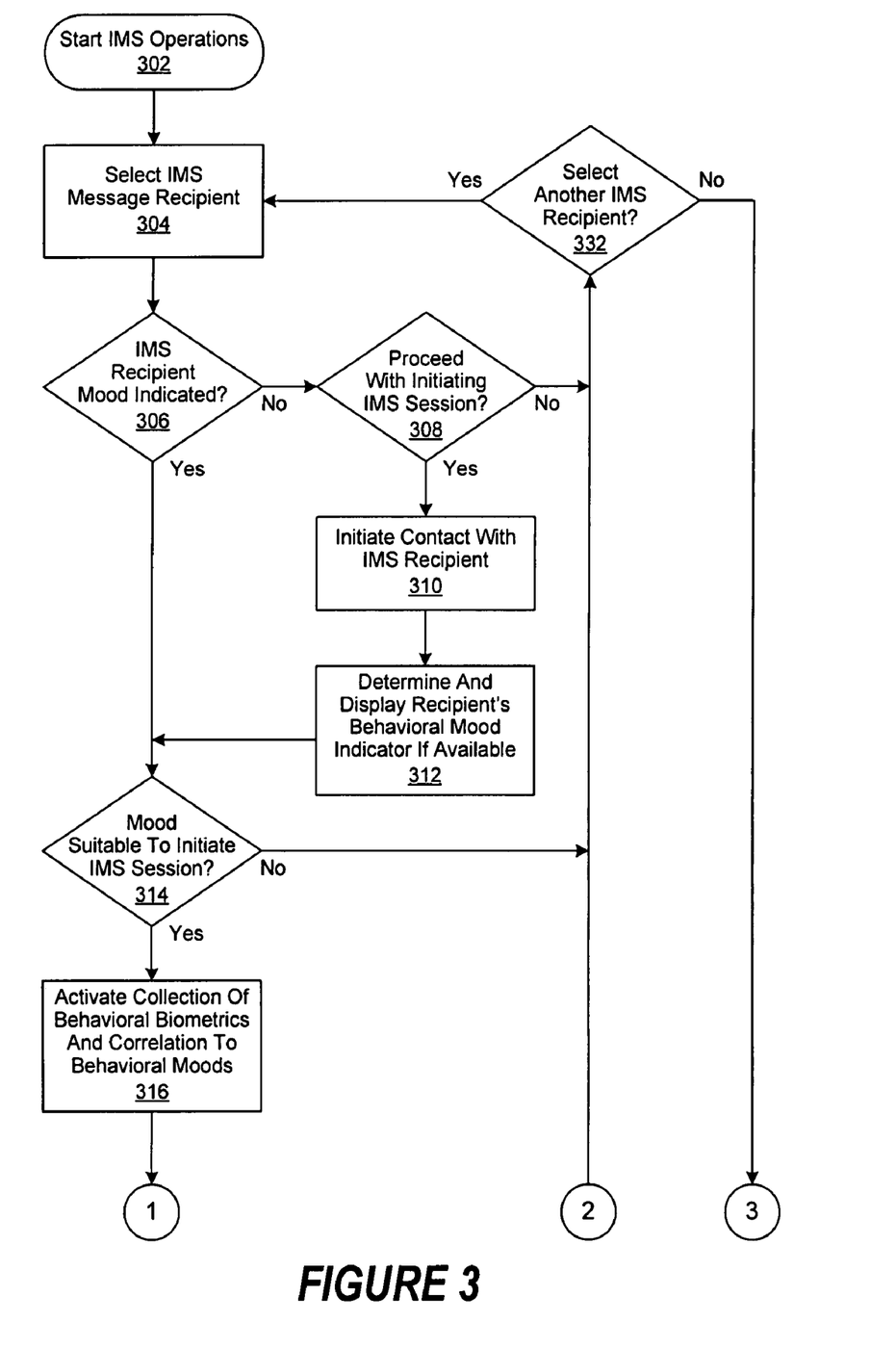
FIG. 3 shows a flowchart of a mood indication system as implemented to indicate the behavioral mood of a user when performing IMS operations.

FIG. 3 shows a flowchart of a mood indication system as implemented in an embodiment of the invention to indicate the behavioral mood of a user when performing instant messaging system (IMS) operations. In this embodiment, IMS operations are begun in step 302, followed by the selection of an IMS message recipient within the user interface (UI) of an IMS client in step 304. Once the recipient is selected, a determination is made in step 306 whether the selected recipient's behavioral mood is indicated. In one embodiment, the behavioral mood of an IMS user is indicated by the application of visual attributes, such as bolding or coloring the text of the user's IMS identifier (ID). For example, the application of bolding and the color red to the IMS user's ID may indicate that the IMS user is in a bad mood or upset. In another embodiment, the IMS user's behavioral mood is indicated by the application of an icon proximate to the user's ID. As an example, a smiling face icon may indicate that the IMS user is in a good mood, while a frowning face icon might indicate that the IMS user is either upset or in a bad mood. Similarly, a stern face icon might indicate the IMS user is in a hurry or is concentrating, while a surprised face icon might indicate that the IMS user has been interrupted.

If it is determined in step 306 that the IMS recipient's mood is not indicated, then a determination is made in step 308 whether to proceed with initiating an IMS session with the selected recipient. If it is determined in step 308 to not proceed with initiating an IMS session with the recipient, then a determination is made in step 332 whether another IMS recipient is to be selected. If it is decided in step 332 to select another IMS recipient, then the process is repeated, beginning with the selection of an IMS recipient in step 304. Otherwise, IMS operations are ended in step 334.

However, if it is determined in step 308 to proceed with initiating an IMS session with the selected recipient, then contact is initiated in step 310. Upon contact, the recipient's last-known behavioral mood is determined and displayed in step 312. As an example, the selected IMS recipient may be indicated to be currently on-line, but their behavioral mood is not displayed because the amount of elapsed time since the recipient's last IMS activity has exceeded the mood indication system's time-out parameters. As a result, the recipient's last known behavioral mood, along with the elapsed time since it was last updated, will be displayed when the recipient responds to the initiated contact.

Once the recipient's last-known behavioral mood is displayed in step 312, or if it is determined in step 306 that the recipient's current behavioral mood is displayed, then a determination is made in 314 whether the recipient's behavioral mood is suitable to initiate an IMS session. If it is determined in step 314 that the recipient's behavioral mood is not suitable to initiate an IMS session, then the process is repeated, beginning with step 332, where a determination is made whether to select another IMS recipient.

However, if it is determined in step 314 that the recipient's behavioral mood is suitable to initiate an IMS session, then the collection of behavioral biometrics and their correlation to corresponding behavioral moods is activated in step 316. Those of skill in the art will be knowledgeable of a variety of approaches for determining the behavioral mood of a user through the collection, analysis and correlation of behavioral biometrics. In various embodiments, the IMS user provides user input to an electronic device through one or more input receptors. The electronic device may be a personal computer (PC), a laptop or tablet PC, a personal digital assistant (PDA), a wireless device such as a cell phone, or any device capable of receiving input and communicating with other electronic devices. The input receptor may be keyboard comprising either electro-mechanical or touch-sensor keys, a touch-sensitive screen, a touchpad, a pointing device such as a mouse or graphics pad, a biometric sensor, or any combination of these.

As the user input is provided to the various input receptors, it is collected by the mood identification system. The collected input is then processed to generate behavioral biometrics, which are in turn correlated to predetermined behavioral moods. For example, each user has a distinct keystroke pattern when using a keyboard. This pattern changes with the behavioral mood of the user. Keystroke latencies and durations can be captured from a keyboard comprising electro-mechanical keys. Similarly, different pressures exerted on individual keys can be captured from a keyboard comprising touch-sensor or pressure sensitive keys. These patterns, latencies, durations and pressures, when analyzed and correlated, can be indicators of the behavioral mood of the user. To continue the example, a user who forcibly depresses keys with a deliberate cadence is likely angry or upset. A user who types rapidly may be intensely focused on what they are doing, whereas a series of lackadaisical or relatively slow and soft keystrokes may indicate that the user is calm and relaxed. Similar analysis and correlation can be applied to behavioral biometrics collected from other input receptors. As another example, the velocity, acceleration and deceleration of pointing device can likewise provide indications of the user's behavioral mood, whether it is a mouse, a stylus on a PDA or graphics pad, or a human finger on a touch-pad or touch-sensitive screen.

Once collection of behavioral biometrics and their correlation to corresponding behavioral moods is activated in step 316, a determination is made in step 318 whether to display behavioral mood indicators in real-time. In one embodiment, the behavioral mood indicator changes as the behavioral mood of the user changes, and is indicated through the application of visual attributes, such as changes in the color of the user's text ID. In another embodiment, different icons are displayed, such as smiling, neutral, stern, or sad face icons to indicate the user's behavioral mood has changed respectively from happy, to receptive, to concerned, to angry. If it is determined in step 318 that these visual attributes or icons are to be displayed in real-time, then they are activated for display during the generation of the IMS message in step 320.

Regardless of whether it is decided in step 318 to not display the behavioral mood indicators, the IMS message session is conducted in step 322, with an ongoing determination made in step 324 to continue the IMS session. If it is determined in step 324 to continue the IMS session, then it is continued, beginning with step 322. If it is decided in step 324 to no longer continue the IMS session, then a determination is made in step 326 whether to apply behavioral mood indicators to the IMS message once it is generated. In one embodiment, behavioral biometrics are collected during the generation of the IMS message and are then processed to generate a set of generalized behavioral biometrics. The set of generalized behavioral biometrics is then correlated to predetermined behavioral moods to indicate the user's generalized behavioral mood when the IMS message was generated. The visual attribute or icon associated with the generalized behavioral mood is then applied to the IMS message. In another embodiment, IMS messages can be sorted by their respective behavioral moods, much like a list can be sorted in ascending or descending alphabetical order.

If it is decided in step 326 to apply behavioral mood indicators to the IMS message once it is generated, then they are applied in step 328. If it is decided in step 326 to not apply the behavioral mood indicators once it is generated, or if they are applied in step 328, a determination is made in step 330 whether to continue IMS operations. If it is determined in step 330 to continue IMS operations, then the process is repeated, beginning with the selection of another IMS recipient in step 332. Otherwise, IMS operations are ended in step 334.

Figure 4:
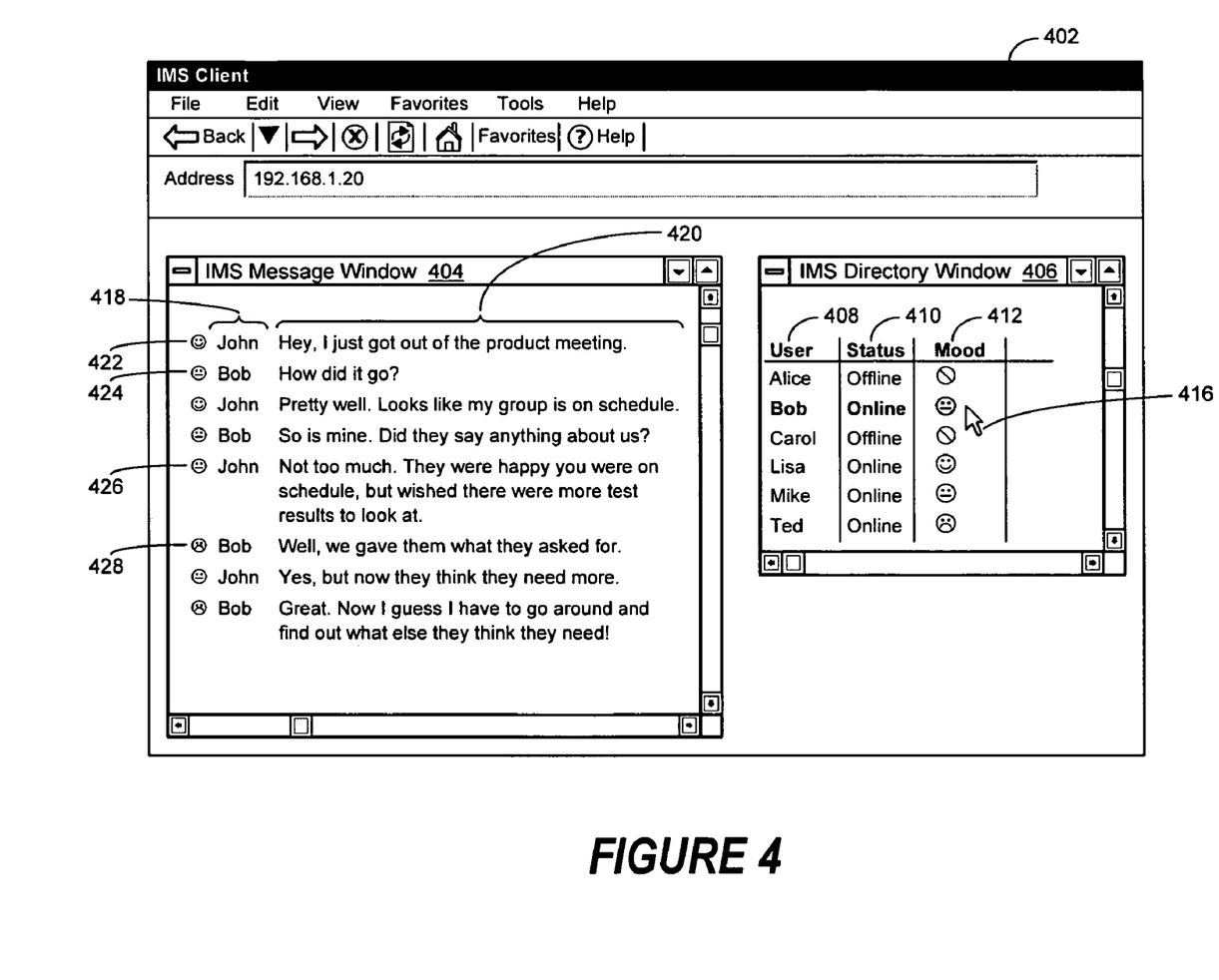
FIG. 4 shows a simplified IMS user interface (UI) as implemented with a mood indication system to indicate the behavioral mood of a user during the generation of an IMS message.

FIG. 4 shows a simplified IMS user interface (UI) 402 as implemented with a mood indication system to indicate the behavioral mood of a user during the generation of an IMS message. In this embodiment, the IMS UI 402 is comprised of an IMS message window 404, an IMS user directory window 406, and cursor 416. The IMS directory window 406 is further comprised of a listing of IMS user IDs 408, their current IMS status 410, and an indicator of their current behavioral mood 412. When IMS operations are begun, the IMS message originator ("John") selects an IMS message recipient ("Bob") with a user gesture such as a double mouse-click once the cursor 416 is placed over the selected recipient's user ID. As illustrated in FIG. 4, an icon indicating a calm, neutral, or receptive, behavioral mood is displayed for "Bob". The IMS message session is then begun in IMS message window 404. During the message session, the respective user ID 418 of each user ("John" and "Bob") is displayed with the user's corresponding message segments 420.

As described in greater detail herein, user input is received by one or more input receptors implemented on each user's computer and is collected by the mood identification system as the IMS message session progresses. The collected user input is then processed to generate behavioral biometrics, which are in turn correlated to predetermined behavioral moods. Each of these predetermined behavioral moods has a corresponding behavioral mood indicator which is applied to the user ID 418 during the course of the IMS message session. In one embodiment, the behavioral mood indicator changes as the behavioral mood of the user changes, and is indicated through the application of visual attributes, such as changes in the color of the user's text ID 418. In another embodiment, different icons 422, 424, 426, 428, such as smiling, neutral, or sad face icons, are displayed proximate to the user ID 418 to indicate the user's behavioral mood has changed respectively from happy, to receptive, to angry.

Figure 5:
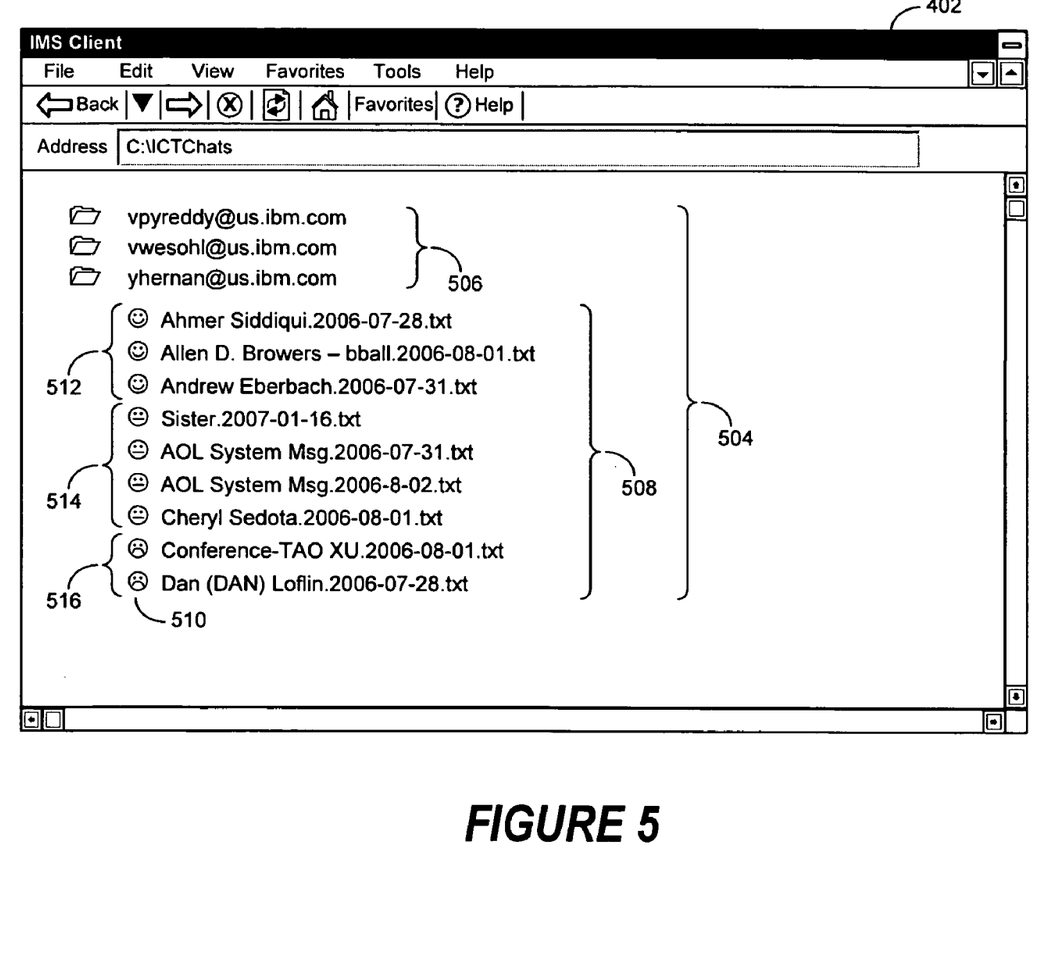
FIG. 5 shows a simplified IMS UI as implemented with a mood indication system to indicate the generalized behavioral mood of a user when an IMS message was generated.

FIG. 5 shows a simplified IMS user interface (UI) 402 as implemented with a mood indication system to indicate the generalized behavioral mood of a user when an IMS conversation generated. In this embodiment, IMS UI 402 comprises stored IMS conversations (i.e. transcripts) 504, further comprising IMS folders 506 and individual IMS transcripts 508. As described in greater detail herein, user input is received by one or more input receptors implemented on each user's computer and is collected by the mood identification system as the IMS session progresses. The collected user input is then processed to generate a set of generalized behavioral biometrics. The set of generalized behavioral biometrics is then correlated to predetermined behavioral moods to indicate the user's generalized behavioral mood when the IMS transcripts were generated. The visual attribute or icon associated 510 with the generalized behavioral mood is then applied to the IMS transcript 508. In one embodiment, IMS transcript 508 can be sorted by their respective behavioral moods 512, 514, 516, much like a list can be sorted in ascending or descending alphabetical order.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for utilizing behavioral mood in an instant messaging system, comprising:
    responsive to a first user initiating establishment of an instant messaging system ("IMS") session, enabling the first user to select, within a user interface of an IMS client of the first user, a second user as a message recipient in the IMS session;
    responsive to the first user selecting the second user, determining a behavioral mood of the second user, the behavioral mood generated by:
        collecting user input of the second user with at least one receptor of an electronic device of the second user;
        processing the collected user input of the second user to generate a plurality of behavioral biometrics for the second user; and
        correlating the generated behavioral biometrics to a selected one of a plurality of predetermined behavioral moods, the selected one having a corresponding visual attribute;
    determining a behavioral mood of the first user, the behavioral mood of the first user generated by:
        collecting user input of the first user with at least one receptor of an electronic device of the first user;
        processing the collected user input of the first user to generate a plurality of behavioral biometrics for the first user; and
        correlating the generated behavioral biometrics for the first user to a particular one of a plurality of predetermined behavioral moods, the particular one having a corresponding visual attribute;
    applying the visual attribute corresponding to the behavioral mood of the first user to electronic messages which are generated, by the first user in the IMS session, for transmission to the second user, wherein the visual attribute corresponding to the behavioral mood of the second user is applied to electronic messages which are generated, by the second user in the IMS session, for transmission to the first user;
    storing, as a message transcript, a copy of each electronic message transmitted from the first user to the second user, including the applied visual attribute corresponding to the behavioral mood of the first user, and a copy of each electronic messages transmitted from the second user to the first user, including the applied visual attribute corresponding to the behavioral mood of the second user, in the IMS session; and
    associating a behavioral mood indicator with the stored message transcript, the associated behavioral mood indicator comprising a visual attribute created based on the applied corresponding visual attributes of the copies stored in the message transcript.

2. The method of claim 1, wherein the at least one receptor of the electronic device of the second user comprises at least one of:
    a keyboard comprising a plurality of electro-mechanical keys;
    a keyboard comprising a plurality of touch sensor keys;
    a touch-sensitive screen;
    a touchpad;
    a pointing device; and
    a biometric sensor.

3. The method of claim 1, wherein the plurality of behavioral biometrics for the second user are generated by measuring a plurality of user gestures of the second user when the second user is providing input to the at least one receptor of the electronic device of the second user.

4. The method of claim 1, wherein the plurality of behavioral biometrics for the second user are generated from user input collected in real-time and then processed to produce a plurality of generalized behavioral biometrics for correlation to the selected one of the plurality of predetermined behavioral moods that was used in determining the behavioral mood of the second user.

5. The method of claim 1, wherein the determined behavioral mood of the second user is indicated by a visual attribute on the user interface of the IMS client of the first user.

6. The method of claim 5, wherein the visual attribute indicating the determined behavioral mood of the second user is an icon.

7. The method of claim 1, the user input of the first user being collected and correlated, in real time, to the particular one of the plurality of predetermined behavioral moods that was used in determining the behavioral mood of the first user and the applied visual attribute corresponding to the behavioral mood of the first user being dynamically applied to electronic messages which are generated by the first user to indicate behavioral mood changes of the first user during the generation of the electronic messages by the first user in the IMS session.

8. The method of claim 1, further comprising:
repeating the storing and the associating for each of a plurality of IMS sessions; and
using the behavioral mood indicator associated with each stored message transcript for sorting the stored message transcripts by behavioral mood.

9. The method of claim 1, wherein the visual attribute applied to electronic messages which are generated by the first user comprises one of an icon and a visual appearance of an identifier of the first user.

10. The method of claim 1, further comprising:
using the applied corresponding visual attributes of the copies stored in the message transcript for sorting the stored copies by behavioral mood.

11. A system comprising:
a processor;
a data bus coupled to the processor; and
a computer-usable medium embodying computer program code, the computer-usable medium being coupled to the data bus, the computer program code utilizing behavioral mood in an instant messaging system and comprising instructions executable by the processor and configured for:
responsive to a first user initiating establishment of an instant messaging system ("IMS") session, enabling the first user to select, within a user interface of an IMS client of the first user, a second user as a message recipient in the IMS session;
responsive to the first user selecting the second user, determining a behavioral mood of the second user, the behavioral mood generated by:
collecting user input of the second user with at least one receptor of an electronic device of the second user;
processing the collected user input of the second user to generate a plurality of behavioral biometrics for the second user; and
correlating the generated behavioral biometrics to a selected one of a plurality of predetermined behavioral moods, the selected one having a corresponding visual attribute;
continuing the establishment of the IMS session only when the behavioral mood of the second user is suitable to the first user;
responsive to continuing the establishment of the IMS session, determining a behavioral mood of the first user, the behavioral mood of the first user generated by:
collecting user input of the first user with at least one receptor of an electronic device of the first user;
processing the collected user input of the first user to generate a plurality of behavioral biometrics for the first user; and
correlating the generated behavioral biometrics for the first user to a particular one of a plurality of predetermined behavioral moods, the particular one having a corresponding visual attribute;
applying the visual attribute corresponding to the behavioral mood of the first user to electronic messages which are generated, by the first user in the IMS session, for transmission to the second user, wherein the visual attribute corresponding to the behavioral mood of the second user is applied to electronic messages which are generated, by the second user in the IMS session, for transmission to the first user;
storing, as a message transcript, a copy of each electronic message transmitted from the first user to the second user, including the applied visual attribute corresponding to the behavioral mood of the first user, and a copy of each electronic messages transmitted from the second user to the first user, including the applied visual attribute corresponding to the behavioral mood of the second user, in the IMS session; and
associating a behavioral mood indicator with the stored message transcript, the associated behavioral mood indicator comprising a visual attribute created based on the applied corresponding visual attributes of the copies stored in the message transcript.

12. The system of claim 11, wherein the at least one receptor of the electronic device of the second user comprises at least one of:
a keyboard comprising a plurality of electro-mechanical keys;
a keyboard comprising a plurality of touch sensor keys;
a touch-sensitive screen;
a touchpad;
a pointing device; and
a biometric sensor.

13. The system of claim 11, wherein the plurality of behavioral biometrics for the second user are generated by measuring a plurality of user gestures of the second user when the second user is providing input to the at least one receptor of the electronic device of the second user.

14. The system of claim 11, wherein the determined behavioral mood of the second user is indicated by a visual attribute on the user interface of the IMS client of the first user.

15. A non-transitory computer-usable storage medium embodying computer program code, the computer program code comprising computer executable instructions configured for:
responsive to a first user initiating establishment of an instant messaging system ("IMS") session, enabling the first user to select, within a user interface of an IMS client of the first user, a second user as a message recipient in the IMS session;
responsive to the first user selecting the second user, determining a behavioral mood of the second user, the behavioral mood generated by:
collecting user input of the second user with at least one receptor of an electronic device of the second user;
processing the collected user input of the second user to generate a plurality of behavioral biometrics for the second user; and
correlating the generated behavioral biometrics to a selected one of a plurality of predetermined behavioral moods, the selected one having a corresponding visual attribute;
determining a behavioral mood of the first user, the behavioral mood of the first user generated by:
collecting user input of the first user with at least one receptor of an electronic device of the first user;
processing the collected user input of the first user to generate a plurality of behavioral biometrics for the first user; and correlating the generated behavioral biometrics for the first user to a particular one of a plurality of predetermined behavioral moods, the particular one having a corresponding visual attribute;

applying the visual attribute corresponding to the behavioral mood of the first user to electronic messages which are generated, by the first user in the IMS session, for transmission to the second user, wherein the visual attribute corresponding to the behavioral mood of the second user is applied to electronic messages which are generated, by the second user in the IMS session, for transmission to the first user;

storing, as a message transcript, a copy of each electronic messages transmitted from the first user to the second user, including the applied visual attribute corresponding to the behavioral mood of the first user, and a copy of each electronic messages transmitted from the second user to the first user, including the applied visual attribute corresponding to the behavioral mood of the second user, in the IMS session; and associating a behavioral mood indicator with the stored message transcript, the associated behavioral mood indicator comprising a visual attribute created based on the applied corresponding visual attributes of the copies stored in the message transcript.

16. The computer usable medium of claim 15, wherein the at least one receptor of the electronic device of the second user comprises at least one of:

a keyboard comprising a plurality of electro-mechanical keys;
a keyboard comprising a plurality of touch sensor keys;
a touch-sensitive screen;
a touchpad;
a pointing device; and
a biometric sensor.

17. The computer usable medium of claim 15, wherein the plurality of behavioral biometrics for the second user are generated from user input collected in real-time and then processed to produce a plurality of generalized behavioral biometrics for correlation to the selected one of the plurality of predetermined behavioral moods that was used in determining the behavioral mood of the second user.

18. The computer usable medium of claim 15, wherein the computer executable instructions are deployable to a client computer from a server at a remote location.

19. The computer usable medium of claim 15, wherein the computer executable instructions are provided by a service provider to a customer on an on-demand basis.

20. The computer usable medium of claim 15, wherein the computer executable instructions are further configured for:

using the applied corresponding visual attributes of the copies stored in the message transcript for sorting the stored copies by behavioral mood.

* * * * *